(12) United States Patent
Suenaga et al.

(10) Patent No.: US 6,910,952 B2
(45) Date of Patent: Jun. 28, 2005

(54) POLISHING COMPOSITION

(75) Inventors: Kenichi Suenaga, Wakayama (JP);
Yoshiaki Oshima, Wakayama (JP);
Toshiya Hagihara, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/753,460

(22) Filed: Jan. 9, 2004

(65) Prior Publication Data
US 2004/0162012 A1 Aug. 19, 2004

(30) Foreign Application Priority Data
Feb. 5, 2003 (JP) .................................. 2003-028348

(51) Int. Cl.$^7$ ................................................ B24B 7/22
(52) U.S. Cl. .......................... 451/41; 51/307; 252/79.1
(58) Field of Search .............................. 451/41, 36, 37; 51/293, 307, 309; 438/691, 692, 693; 252/79.1

(56) References Cited

U.S. PATENT DOCUMENTS

| | | | | | |
|---|---|---|---|---|---|
| 4,169,337 A | * | 10/1979 | Payne | ......................... | 451/41 |
| 4,304,575 A | * | 12/1981 | Payne | ......................... | 51/308 |
| 4,462,188 A | * | 7/1984 | Payne | ......................... | 451/41 |
| 2003/0110711 A1 | | 6/2003 | Ota et al. | | |

FOREIGN PATENT DOCUMENTS

| | | |
|---|---|---|
| EP | 1123956 A1 | 8/2001 |
| GB | 2354769 A | 4/2001 |
| GB | 2375116 A | 11/2002 |
| JP | 2001-6162 A | 1/2001 |
| JP | 2002-30274 A | 2/2002 |

* cited by examiner

Primary Examiner—Robert A. Rose
(74) Attorney, Agent, or Firm—Birch, Stewart, Kolasch & Birch, LLP

(57) ABSTRACT

A polishing composition for a substrate for memory hard disk, comprising silica particles in an aqueous medium, wherein the silica particles satisfy a specified relationship between an average particle size of the silica particles on the number basis and a standard deviation on the number basis, wherein the average particle size is obtained by a determination by transmission electron microscope (TEM) observation, and wherein a particle size and a cumulative volume frequency in a range of particle sizes of from 60 to 120 nm satisfies a specified relationship; a method of reducing microwaviness of a substrate for memory hard disk, comprising the step of polishing the substrate for memory hard disk with the polishing composition; and a method for manufacturing a substrate for memory hard disk, comprising the step of polishing a Ni—P plated substrate for memory hard disk with the polishing composition. The method can be suitably used for the manufacture of a substrate for precision parts, such as a substrate for memory hard disk.

20 Claims, 3 Drawing Sheets

POLISHING COMPOSITION

This Nonprovisional application claims priority under 35 U.S.C. § 119(a) on Patent Application No. 2003-028348 filed in JAPAN on Feb. 5, 2003, the entire contents of which is hereby incorporated by reference.

FIELD OF THE INVENTION

The present invention relates to a polishing composition, a method of reducing microwaviness of a substrate for a memory hard disk with the above-mentioned polishing composition, and a method for manufacturing a substrate for memory hard disk with the above-mentioned polishing composition.

BACKGROUND OF THE INVENTION

In recent memory hard disk drives, high storage capacity and miniaturization have been demanded. In order to increase the recording density, it has been strongly urged to lower flying height of a magnetic head and to reduce the unit recording area. Along with this trend, the surface quality required after polishing has become severely assessed every year even in a method for manufacturing a substrate for memory hard disk, so that the sizes and depths of scratches and pits allowed in order to meet the requirements of the reductions in the surface roughness, the average waviness, the roll-off, and the projections and the decrease in unit area have been becoming increasingly small.

In order to meet such requirements, there has been proposed a polishing composition for an aluminum disk substrate containing an abrasive containing plural colloidal silica particles having different mono-modal number particle size distributions, capable of obtaining an aluminum disk substrate having small average waviness and few surface defects (see, for instance, Japanese Patent Laid-Open No. 2002-30274).

However, in the above-mentioned polishing composition, while the average waviness is reduced, it is unsatisfactory in the reduction in microwaviness (short wavelength (50 to 500 $\mu$m) and long wavelength (500 $\mu$m to 5 mm)), which takes an intermediary wavelength of the roughness and the average waviness which have been recently considered to be important in the lowering of the flying height of a magnetic head. Therefore, further improvements have been desired.

SUMMARY OF THE INVENTION

The present invention relates to:

[1] a polishing composition for a substrate for memory hard disk, comprising silica particles in an aqueous medium, wherein the silica particles satisfy a relationship between an average particle size (r) of the silica particles on the number basis and a standard deviation ($\sigma$) on the number basis of the following formula (1):

$$\sigma \geq 0.3 \times r \qquad (1)$$

wherein r is an average particle size (nm) of the silica particles on the number basis, and $\sigma$ is a standard deviation (nm) on the number basis, wherein the average particle size is obtained by a determination by transmission electron microscope (TEM) observation, and wherein a relationship between a particle size (R) and a cumulative volume frequency (V) in a range of particle sizes of from 60 to 120 nm satisfies the following formulas (2) and (3):

$$V \geq 0.5 \times R \qquad (2)$$

$$V \leq 0.25 \times R + 75 \qquad (3)$$

wherein R is a particle size (nm) of the silica particles, and V is a cumulative volume frequency (%) counted from a small particle size side of the silica particles;

[2] a method of reducing microwaviness of a substrate for memory hard disk, comprising the step of polishing the substrate for memory hard disk with the polishing composition of item [1] above; and

[3] a method for manufacturing a substrate for memory hard disk, comprising the step of polishing a Ni—P plated substrate for memory hard disk with the polishing composition of item [1] above.

DETAILED DESCRIPTION OF THE INVENTION

Figure 1:
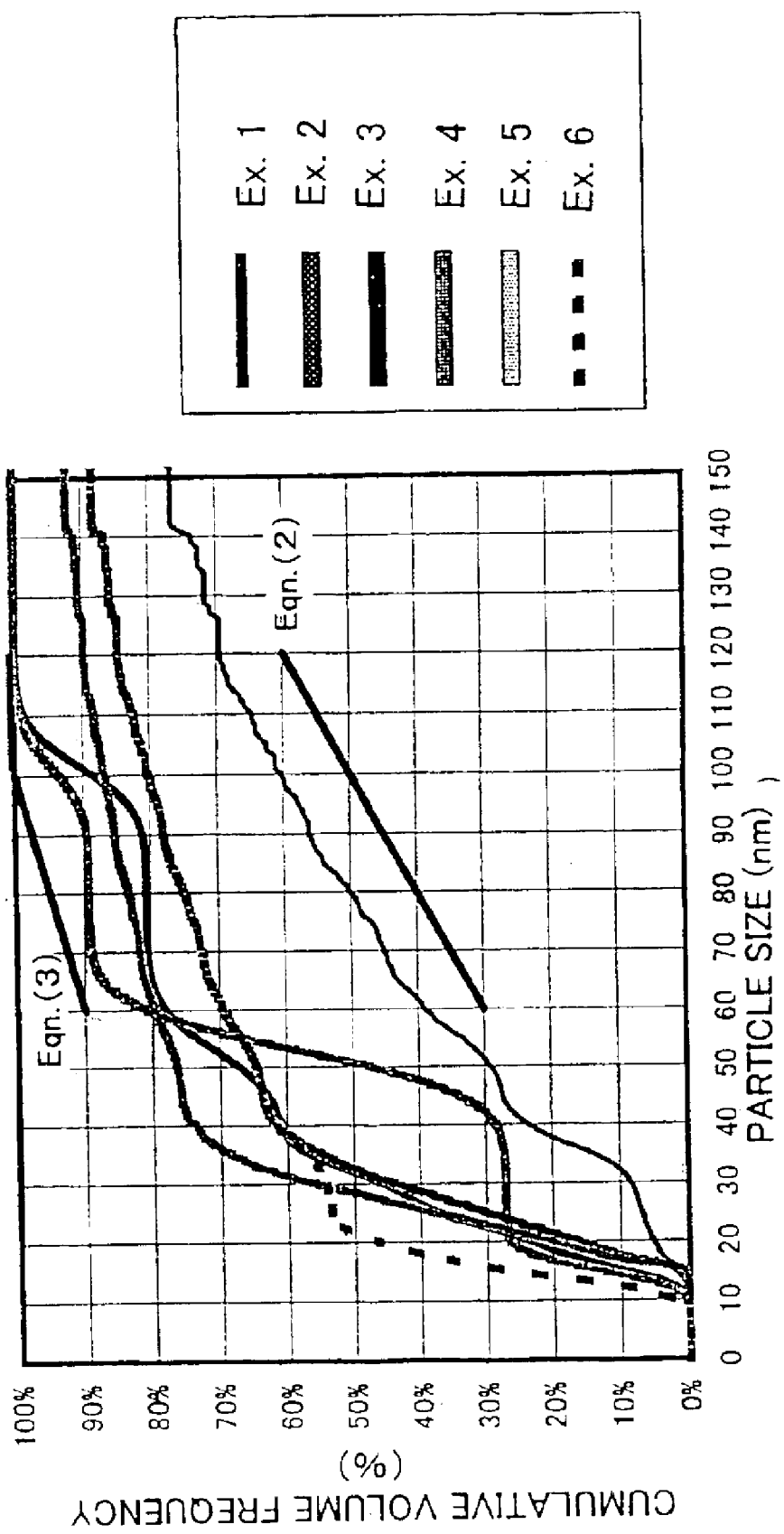
FIG. 1 is a graph for particle size-cumulative volume frequency of silica particles used in each Example.

All publications cited herein are hereby incorporated by reference.

The present invention relates to a polishing composition for a substrate for a memory hard disk, capable of, for instance, reducing microwaviness of a surface of the substrate for a memory hard disk to a sufficient level for practical use without losing productivity, a method of reducing microwaviness of a substrate for a memory hard disk with the above-mentioned polishing composition, and a method for manufacturing a substrate for a memory hard disk with the polishing composition.

These and other advantages of the present invention will be apparent from the following description.

The polishing composition of the present invention is a polishing composition for a substrate for memory hard disk (hereinafter simply referred to as a "substrate for a disk"), containing an aqueous medium and specified silica particles as an abrasive.

The silica particles used in the present invention have a specified particle size distribution in which a relationship between an average particle size (r) of the silica particles on the number basis and a standard deviation ($\sigma$) on the number basis satisfies the above-mentioned formula (1), and a relationship between a particle size (R) and a cumulative volume frequency (V) within a range of particle sizes of from 60 to 120 nm of the silica particles satisfies the above-mentioned formula (2) and (3). One of the great features of the polishing composition of the present invention resides in that the polishing composition contains the silica particles as an abrasive. Since the polishing composition has the above constitution, the microwaviness on a surface of a substrate for a disk can be sufficiently reduced to a practical usable level. Accordingly, the surface of the substrate for a disk polished with the polishing composition of the present invention has excellent smoothness.

In the present specification, the term "microwaviness" refers to dents and projections of a surface having an intermediary wavelength between roughness and waviness, which is classified into short-wavelength waviness (waviness at a wavelength of from 50 to 500 μm) and long-wavelength waviness (waviness at a wavelength of from 500 μm to 5 mm).

In other words, the microwaviness can be used as an index showing the surface smoothness of a polished object, which affects a flying height of a magnetic head. Therefore, the smaller the microwaviness, the more excellent the surface smoothness of the polished object, so that the flying height of the magnetic head can be lowered.

Generally, the microwaviness of a surface of a polished object is determined as an average of each of its parts, which are picked up randomly from the surface of the polished object. The microwaviness is not even in individual positions of the surface of the object and usually shows a considerably large variance. Therefore, in order to obtain the microwaviness of the surface of the object the measurement positions and the number of measurements must be determined, so that the population mean can be effectively deduced. Hence, the reliability of the data greatly depends on the selection of the measurement positions and the number of measurements. In the present invention, the microwaviness is obtained by this method having higher reliability.

The details for the method for determining the microwaviness in the present invention will be described in Examples set forth below.

The silica particles used in the present invention include, for instance, colloidal silica particles, fumed silica particles, the surface-modified silica particles, and the like. Among them, the colloidal silica particles are preferable, from the viewpoint of obtaining a surface of a disk substrate having a higher level of smoothness. The colloidal silica particles can be those which are commercially available. Alternatively, the colloidal silica particle can be prepared, for instance, from an aqueous silicic acid by a known preparation process. The silica particles are preferably used in the form of a slurry.

The particle size distribution of the above mentioned silica particles can be determined by the method described below. Specifically, photographs of the silica particles observed by a transmission electron microscope (TEM) "JEM-2000 FX" commercially available from JEOL LTD. (80 kV, magnification: 10000 to 50000) are incorporated into a personal computer as image data with a scanner connected thereto. The projected area diameter of individual silica particles for 1000 or more is determined using an analysis software "WinROOF" (commercially available from MITANI CORPORATION), and considered as the diameter of the silica particles. By analyzing data using the spreadsheet software "EXCEL" (commercially available from Microsoft Corporation), an average particle size (r) and a standard deviation (σ) on the number basis are obtained.

In the present invention, the silica particles satisfy the relationship between an average particle size (r) of the silica particles on the number basis and a standard deviation (σ) on the number basis of the formula (1). The silica particles preferably satisfy the relationship of the formula (4):

$$\sigma \geq 0.34 \times r, \quad (4)$$

more preferably satisfy the relationship of the formula (5):

$$\sigma \geq 0.375 \times r, \quad (5)$$

from the viewpoint of increasing the polishing rate.

Also, the silica particles preferably satisfy the relationship of the formula (6):

$$-0.2 \times r + 25 \geq \sigma, \quad (6)$$

and the silica particles more preferably satisfy the relationship of the formula (7):

$$-0.25 \times r + 25 \geq \sigma, \quad (7)$$

from the viewpoint of reducing the surface roughness.

Based on the data for the particle size distribution of the silica particles obtained by calculating the diameters of the silica particles into the volume of the silica particles using the above-mentioned spreadsheet software "EXCEL," a ratio of particles having a given particle size (% based volume) is expressed as a cumulative frequency counted from a small particle size side in the entire particles, and a cumulative volume frequency (%) is obtained. Based on the particle size and the data for the cumulative volume frequency of the silica particles obtained as mentioned above, a graph of particle size-cumulative volume frequency is obtained by plotting the cumulative volume frequency against the particle size.

The silica particles in the present invention have a particle size distribution, in which a relationship between the particle size (R) and the cumulative volume frequency (V) in the above-mentioned graph of particle size-cumulative volume frequency satisfies the above-mentioned formulas (2) and (3) within a range of particle sizes of from 60 to 120 nm. From the viewpoint of reducing the microwaviness of the surface of the substrate for a disk, thereby improving the surface smoothness of the substrate, those having a particle size distribution wherein the cumulative volume frequency is 90% within a range of particle sizes of 105 nm or more are preferable.

Among them, from the viewpoint of even more excellent reduction in scratches and in surface roughness, the above-mentioned silica particles have a particle size distribution, in which the relationship between R and V preferably satisfies the formula (8):

$$V \geq 0.60 \times R - 5, \quad (8)$$

more preferably the relationship between R and V satisfies the formula (9):

$$V \geq 0.70 \times R - 10, \quad (9)$$

and even more preferably the relationship between R and V satisfies the formula (10):

$$V \geq 0.80 \times R - 14 \quad (10)$$

within a range of particle sizes of from 60 to 120 nm.

Moreover, from the viewpoint of more excellent reduction in micropits, the above-mentioned silica particles have a particle size distribution, in which the relationship between R and V preferably satisfies the formula (11):

$$V \leq 0.35 \times R + 65, \quad (11)$$

and more preferably the relationship between R and V preferably satisfies the formula (12):

$$V \leq 0.45 \times R + 55, \quad (12)$$

within a range of particle sizes of from 60 to 120 nm.

In the present invention, the above-mentioned formula (1) is an index showing the spread of the particle size distribution of the silica particles. The silica particles having a particle size distribution within the specified range means that the silica particles have a particle size distribution, the spread of which is a given level or more.

Also, in the present invention, the above-mentioned formulas (2) and (3) are indices each showing a ratio of the silica particles existing therein. The silica particles satisfying the above-mentioned formulas (2) and (3) within the range of particles size of from 60 to 120 nm means that the silica particles contain silica particles having a given particle size in a given ratio or more.

By satisfying these formulas, the microwaviness can be reduced to a sufficient level for practical use without losing productivity.

In addition, the silica particles have a particle size distribution in which the relationship between R and V preferably satisfies the formula (13):

$$V \leq (2/3) \times R + 50 \qquad (13)$$

within a range of particle sizes of from 5 to 60 nm, from the viewpoint of an excellent reduction in the generation of carrier squeals. It is more preferable that the silica particles have a particle size distribution in which the relationship between R and V satisfies the formula (14):

$$V \geq R - 30 \qquad (14)$$

within a range of particle sizes of from 30 to 60 nm, from the viewpoint of an excellent reduction in micropits.

The silica particles usable in the present invention may be those composed of one kind of silica particles having a specified particle size distribution, or an admixture of two or more kinds of silica particles having different particle size distributions, as long as the silica particles have the particle size distributions as defined above. When two or more kinds of the silica particles are used, the particle size distribution of the silica particles refers to the particle size distribution of the mixed silica particles.

The method for adjusting the particle size distribution of the silica particles is not particularly limited. For instance, in the case where the silica particles are colloidal silica particles, the method includes a method including the step of adding the particles which can serve as a new core during the stage of particle growth in the preparation steps, thereby giving a particle size distribution in a final product; the method including the step of mixing two or more silica particles having different particle size distributions; and the like.

As the abrasive, the abrasives that are generally used for polishing can be used in addition to the above-mentioned silica particles. The abrasive includes metals; carbides of metals or metalloids, nitrides of metals or metalloids, oxides of metals or metalloids or borides of metals or metalloids; diamond, and the like. The elements for metals or metalloids include those elements belonging to the Group 2A, 2B, 3A, 3B, 4A, 4B, 5A, 6A, 7A or 8 of the Periodic Table (long period form). Concrete examples of the abrasives include aluminum oxide, silicon carbide, diamond, magnesium oxide, zinc oxide, titanium oxide, cerium oxide, zirconium oxide and the like. It is preferable to use one or more kinds of these abrasives from the viewpoint of increasing the polishing rate. Among them, aluminum oxide, cerium oxide, zirconium oxide and titanium oxide are suitable for polishing a substrate of precision parts, such as substrates for magnetic recording media. As to aluminum oxide, various crystal systems such as α, θ and γ are known, and they can properly be used and selected as occasion demands.

The average primary particle size of the abrasive other than the silica particles is 200 nm or less. The average primary particle size is preferably 1 nm or more, more preferably 10 nm or more, even more preferably 20 nm or more, from the viewpoint of increasing the polishing rate, and the average primary particle size is 200 nm or less, preferably 150 nm or less, more preferably 120 nm or less, even more preferably 100 nm or less, from the viewpoint of reducing the surface roughness (Ra, Rmax) and the waviness (Wa). The average primary particle size is preferably from 1 to 200 nm, more preferably from 1 to 150 nm, even more preferably from 10 to 120 nm, even more preferably from 20 to 100 nm. Further, when the primary particles are aggregated to form a secondary particle, the average secondary particle size is preferably from 50 to 3000 nm, more preferably from 100 to 1500 nm, even more preferably from 200 to 1200 nm, from the viewpoint of increasing the polishing rate, and from the viewpoint of reducing the surface roughness of an object to be polished in the same manner as above.

The average primary particle size of the abrasive other than the silica particles can be obtained by analyzing the images observed with a scanning electron microscope (magnification: preferably from 3000 to 100000 times), and determining a particle size at 50% counted from a smaller particle size side of the primary particles in a cumulative particle size distribution on the number basis (D50). Here, a particle size of one primary particle is defined as an arithmetic means of major axis length and minor axis length of the particle. In addition, the average secondary particle size can be determined as a volume-average particle size by using a laser beam diffraction method.

The content of the silica particles is preferably 0.5% by weight or more, more preferably 1% by weight or more, even more preferably 3% by weight or more, even more preferably 5% by weight or more, of the polishing composition, from the viewpoint of increasing the polishing rate, and the content is preferably 20% by weight or less, more preferably 15% by weight or less, even more preferably 13% by weight or less, even more preferably 10% by weight or less, of the polishing composition, from the viewpoint of improving the surface quality and from the viewpoint of having economic advantages. Accordingly, the content is preferably from 0.5 to 20% by weight, more preferably from 1 to 15% by weight, even more preferably from 3 to 13% by weight, even more preferably from 5 to 10% by weight, of the polishing composition.

Furthermore, since the polishing composition of the present invention further contains at least one member selected from the group consisting of acids, salts thereof and oxidizing agents, even more excellent effects can be exhibited.

It is preferable that the polishing composition of the present invention contains an oxidizing agent from the viewpoint of further increasing the polishing rate. The oxidizing agent includes peroxides, permanganic acid or salts thereof, chromic acid or salts thereof, peroxo acid or salts thereof, oxyacid or salts thereof, metal salts, sulfuric acid, and the like.

The above-mentioned peroxide includes hydrogen peroxide, sodium peroxide, barium peroxide, and the like; the permanganic acid or salts thereof include potassium permanganate, and the like; the chromic acid or salts thereof include metal salts of chromic acid, metal salts of dichromic acid, and the like; the peroxo acid or salts thereof include peroxodisulfuric acid, ammonium peroxodisulfate, metal salts of peroxodisulfuric acid, peroxophosphoric acid, peroxosulfuric acid, sodium peroxoborate, performic acid, peracetic acid, perbenzoic acid, perphthalic acid, and the like; oxyacid or salts thereof include hypochlorous acid, hypobromous acid, hypoiodous acid, chloric acid, bromic acid, iodic acid, sodium hypochlorate, calcium hypochlorate, and the like; metal salts include iron (III) chloride, iron (III) nitrate, iron (III) sulfate, iron (III) citrate, ammonium iron (III) sulfate, and the like. The preferred oxidizing agent is hydrogen peroxide, iron (III) nitrate, peracetic acid, ammonium peroxodisulfate, iron (III) sulfate, ammonium iron (III) sulfate and the like. Hydrogen peroxide is even more preferable, from the viewpoints of being widely used and inexpensive without depositing metal ions to the surface of the substrate. These oxidizing agents can be used alone or in admixture of two or more kinds.

The content of the oxidizing agent is preferably 0.002% by weight or more, more preferably 0.005% by weight or more, even more preferably 0.007% by weight or more, even more preferably 0.01% by weight or more, of the polishing composition, from the viewpoint of increasing the polishing rate. Also, the content is preferably 20% by weight or less, more preferably 15% by weight or less, even more preferably 10% by weight or less, even more preferably 5% by weight or less, of the polishing composition, from the viewpoints of reducing the surface roughness and the microwaviness, and reducing the surface defects such as pits and scratches, thereby improving the surface quality, and from the viewpoint of economic advantages. The content is preferably from 0.002 to 20% by weight, more preferably from 0.005 to 15% by weight, even more preferably from 0.007 to 10% by weight, even more preferably from 0.01 to 5% by weight, of the polishing composition.

It is preferable that the polishing composition of the present invention contains an acid and/or a salt thereof, from the viewpoint of further increasing the polishing rate. As the acid and/or salt thereof, those compounds of which acidic form has pK1 of 2 or less are preferable. The compound has a pK1 of preferably 1.5 or less, more preferably 1 or less, and even more preferably those having such strong acidity which cannot be expressed by pK1 are desirable, from the viewpoint of reducing microscratches. Examples thereof include an inorganic acid, such as nitric acid, sulfuric acid, sulfurous acid, persulfuric acid, hydrochloric acid, perchloric acid, phosphoric acid, phosphonic acid, phosphinic acid, pyrophosphoric acid, tripolyphosphoric acid, or amide sulfuric acid, and a salt thereof; organic phosphonic acid, such as 2-aminoethylphosphonic acid, 1-hydroxyethylidene-1,1-diphosphonic acid, aminotri(methylenephosphonic acid), ethylenediaminetetra(methylenephosphonic acid), diethylenetriaminepenta(methylenephosphonic acid), ethane-1,1-diphosphonic acid, ethane-1,1,2-triphosphonic acid, ethane-1-hydroxy-1,1-diphosphonic acid, ethane-1-hydroxy-1,1,2-triphosphonic acid, ethane-1,2-dicarboxy-1,2-diphosphonic acid, methanehydroxyphosphonic acid, 2-phosphonobutane-1,2-dicarboxylic acid, 1-phosphonobutane-2,3,4-tricarboxylic acid, or α-methylphosphonosuccinic acid, and a salt thereof; an aminocarboxylic acid, such as glutamic acid, picolinic acid, or aspartic acid, and a salt thereof; a carboxylic acid, such as oxalic acid, nitroacetic acid, maleic acid or oxaloacetic acid, and a salt thereof; and the like. Among them, the inorganic acids, the organic phosphonic acids, and salts thereof are preferable, from the viewpoint of reducing the microscratches. Among the inorganic acids and salts thereof, nitric acid, sulfuric acid, hydrochloric acid, perchloric acid and salts thereof are more preferable. Among the organic phosphonic acid and salts thereof, 1-hydroxyethylidene-1,1-diphosphonic acid, aminotri(methylenephosphonic acid), ethylenediaminetetra(methylenephosphonic acid), diethylenetriaminepenta(methylenephosphonic acid), and salts thereof are more preferable. These acids and salts thereof can be used alone or in admixture of two or more kinds. Here, pK1 is defined as follows: A logarithmic value of an inverse of an acid dissociation constant (at 25° C.) of an organic compound or an inorganic compound is usually expressed as pKa, and a logarithmic value of an inverse of a first acid dissociation constant is defined as pK1. The pK1 of each compound is listed in, for instance, in *Kagaku Binran* (*Kiso-hen*) II, Fourth Revision, pp. 316–325 (Edit. by Nippon Kagakukai), and the like. In the present invention, it is even more preferable to use those acids having pK1 of 2 or less and/or a salt thereof, from the viewpoint of satisfying both reduction of microscratches and increase in the polishing rate.

The salts of these acids are not particularly limited. Examples thereof include salts with a metal, ammonium, an alkylammonium, an organic amine or the like. Concrete examples of the metals include those metals belonging to the Group 1A, 1B, 2A, 2B, 3A, 3B, 4A, 6A, 7A or 8 of the Periodic Table (long period form). Among them, the salt with the metal belonging to Group 1A or with ammonium is preferable, from the viewpoint of reducing the microscratches.

The content of the above-mentioned acid and the salt thereof is preferably from 0.0001 to 5% by weight, more preferably from 0.0003 to 4% by weight, even more preferably from 0.001 to 3% by weight, even more preferably from 0.0025 to 2.5% by weight, of the polishing composition, from the viewpoint of exhibiting sufficient polishing rate and from the viewpoint of improving the surface quality.

As the aqueous medium in the polishing composition of the present invention, for instance, distilled water, ion exchanged water or ultrapure water is used. From the viewpoint of efficiently polishing the object to be polished, the content is preferably 55% by weight or more, more preferably 67% by weight or more, even more preferably 75% by weight or more, even more preferably 84% by weight or more, of the polishing composition, and the content is preferably 99.4979% by weight or less, more preferably 98.9947% by weight or less, even more preferably 96.992% by weight or less, even more preferably 94.9875% by weight or less, of the polishing composition. The content is preferably from 55 to 99.4979% by weight, more preferably from 67 to 98.9947% by weight, even more preferably from 75 to 96.992% by weight, even more preferably from 84 to 94.9875% by weight of the polishing composition.

The concentration of each component of the above-mentioned polishing composition may be any one of the concentration during the preparation of the composition and the concentration upon use. In many cases, the polishing composition is usually prepared as a concentrate, which is diluted upon use.

In addition, there can be added other component(s) to the polishing composition of the present invention as occasion demands. The other component(s) include thickeners, dispersing agents, anticorrosive agents, basic substances, surfactants, and the like.

The polishing composition of the present invention can be prepared by mixing the above-mentioned abrasive and the aqueous medium, and optionally, an oxidizing agent, an acid and/or a salt thereof, and other components by a known method.

It is preferable that the pH of the polishing composition of the present invention is appropriately determined depending upon the kinds of the objects to be polished and the required properties. Although the pH of the polishing composition cannot be absolutely determined because it differs depending upon the materials of the objects to be polished, it is desirable that the pH generally in metal materials is acidic, preferably less than 7, more preferably 6 or less, even more preferably 5 or less, even more preferably 4 or less, from the viewpoint of increasing the polishing rate. In addition, the pH is preferably 1 or more, more preferably 1.1 or more, even more preferably 1.2 or more, even more preferably 1.3 or more, from the viewpoints of influence to a human body and corrosivity of the machine. Even more preferably in the substrate for precision parts mainly made of a metal such as an aluminum alloy substrate plated with nickel-phosphorus (Ni—P), it is preferable that the pH is acidic, preferably 4.5 or less, more preferably 4 or less, even more preferably 3.5 or less, even more preferably 3 or less, from the viewpoint of increasing the polishing rate. Therefore, although the pH may be set in accordance with the purpose which is to be considered important, even more preferably in the substrate for precision parts made of a metal such as an Ni—P plated aluminum alloy substrate, the pH is preferably from 1 to 4.5, more preferably from 1.1 to 4, even more preferably from 1.2 to 3.5, even more preferably from 1.3 to 3, from the total viewpoints mentioned above. The pH can be adjusted by properly adding an inorganic acid such as nitric acid or sulfuric acid, an organic acid such as oxalic acid, an ammonium salt, or a basic substance such as an aqueous ammonia, potassium hydroxide, sodium hydroxide or an amine in a desired amount.

The method of reducing microwaviness of a substrate for a disk of the present invention includes a process including the step of applying the polishing composition of the present invention to a substrate to be polished, represented by a substrate for memory hard disk, when polishing. The polishing process for a substrate to be polished includes the step of polishing a substrate to be polished with the polishing composition of the present invention, or polishing a substrate to be polished with the polishing composition prepared by mixing each component so as to have the same composition as the polishing composition of the present invention, and the process can be even more suitably used for the manufacture of a substrate for precision parts, such as a substrate for memory hard disk. In addition, the polishing composition of the present invention can remarkably reduce microwaviness of the substrate for a disk, thereby exhibiting high polishing rate.

The material for an object to be polished by the polishing composition of the present invention includes, for instance, metals or metalloids such as silicon, aluminum, nickel, tungsten, copper, tantalum and titanium, and alloys thereof; glassy substances such as glass, glassy carbon and amorphous carbons; ceramic materials such as alumina, silicon dioxide, silicon nitride, tantalum nitride, and titanium carbide; resins such as polyimide resins; and the like. Among them, an object to be polished is preferably made of a metal such as aluminum, nickel, tungsten or copper, or made of an alloy containing these metals as the main components, for instance, an Ni—P plated aluminum alloy substrate is more preferable.

The polishing process of a substrate for a disk according to the method of reducing the microwaviness of a substrate for a disk in the present invention can be, for instance, suitably carried out by using a known polishing machine. For instance, the polishing process is carried out by the steps of setting a substrate for a disk between polishing platens to which a nonwoven polishing pad made of an organic polymer or the like, preferably made of polyurethane, is attached; feeding a polishing composition in an amount of from 1 to 30 mL/min, preferably from 3 to 20 mL/min as a flow rate, per one substrate for a disk with a diameter of 95 mm to the surface of a substrate to be polished; moving the polishing platens and the substrate for a disk so that a relative rate between an upper platen or a lower platen and the substrate for a disk is usually from 0.1 to 2 m/sec, preferably from 0.3 to 1 m/sec at the center of the platens, with applying a given pressure of usually from 2.9 to 14.7 kPa, preferably from 4.9 to 10.8 kPa as a load.

According to the method of reducing the microwaviness of a substrate for a disk, the microwaviness of the surface of a substrate for a disk is efficiently reduced without losing productivity, and further surface defects such as micropits are reduced, so that the surface smoothness of the substrate for a disk is sufficiently obtained for practical use.

In addition, in one embodiment of the present invention, there is provided a method for manufacturing a substrate for a disk including the step of polishing a substrate to be polished with the polishing composition of the present invention, even more preferably a method for manufacturing a substrate for a disk including the step of polishing a Ni—P plated substrate for a disk with the polishing composition of the present invention.

The method for manufacturing a Ni—P plated substrate for a disk of the present invention (hereinafter referred to as the method for manufacturing a substrate for a disk), includes the step of polishing the substrate with the polishing composition of the present invention. This step is preferably carried out in the second step or subsequent steps among the plural polishing steps, and more preferably in the final polishing step. For instance, the above-mentioned substrate for a disk, e.g., a Ni—P plated aluminum alloy substrate, of which short wavelength waviness is adjusted to from 0.4 to 0.6 nm and long wavelength waviness is adjusted to from 0.35 to 0.5 nm as the microwaviness, obtained in the first polishing step or the second polishing step, in which the polishing slurry containing a known abrasive, such as alumina abrasive grains, is used, is further polished by the polishing process with the polishing composition of the present invention. The polishing step with the polishing composition of the present invention may be carried out in the same manner as the above-mentioned method of reducing microwaviness of a substrate for a disk.

In the method for manufacturing a substrate for a disk of the present invention, when it is desired to manufacture a substrate for a disk having a short wavelength waviness of 0.12 nm or less, and a long wavelength waviness of 0.25 nm or less, as the microwaviness, in the polishing process including only two steps, it is preferable that the polishing process for a substrate for a disk with the polishing composition of the present invention is carried out as the second polishing step.

According to the method for manufacturing a substrate for a disk of the present invention, a Ni—P plated substrate for a disk, having reduced microwaviness and an excellent surface smoothness can be efficiently manufactured.

EXAMPLES

The following examples further describe and demonstrate embodiments of the present invention. The examples are given solely for the purposes of illustration and are not to be construed as limitations of the present invention.

(Object to Be Polished)

Each of the polishing compositions obtained in the following Examples and Comparative Examples was evaluated for its polishing properties against a Ni—P plated, aluminum alloy substrate having a thickness of 1.27 mm, and a diameter of 95 mm which was previously roughly polished with a polishing slurry containing alumina abrasives so that the substrate had a short-wavelength waviness of 0.5 nm and a long-wavelength waviness of 0.45 nm as microwaviness as a substrate to be polished.

Examples 1 to 6 and Comparative Examples 1 to 3

There were added together the colloidal silicas (Silicas A to H) as listed in Table 1, hydrogen peroxide ($H_2O_2$), HEDP (1-hydroxyethylidene-1,1-diphosphonic acid) and balance water (ion-exchanged water) with mixing, to give each of the polishing compositions having the composition as shown in Table 1. The order of adding is as follows: A 35% by weight aqueous hydrogen peroxide was added to an aqueous solution prepared by diluting HEDP in water, thereafter other components were added thereto, and a colloidal silica slurry was finally added to the mixture obtained with cautiously stirring not to cause gelation, to give a polishing composition.

Silica E is "Cataloid SI-80P" (commercially available from CATALYSTS & CHEMICALS INDUSTRIES CO., LTD.)

Silica F is "Syton 520" (commercially available from Du Pont K.K.);

Silica G is "Syton 524" (commercially available from Du Pont K.K.);

Silica H is "Syton HS40" (commercially available from Du Pont K.K.);

HEDP is 1-hydroxyethylidene-1,1-diphosphonic acid "Dequest 2010" (commercially available from SOLUTIA JAPAN INC.); and $H_2O_2$ is a 35% by weight aqueous hydrogen peroxide (commercially available from ASAHI DENKA KOGYO K.K.).

Figure 2:
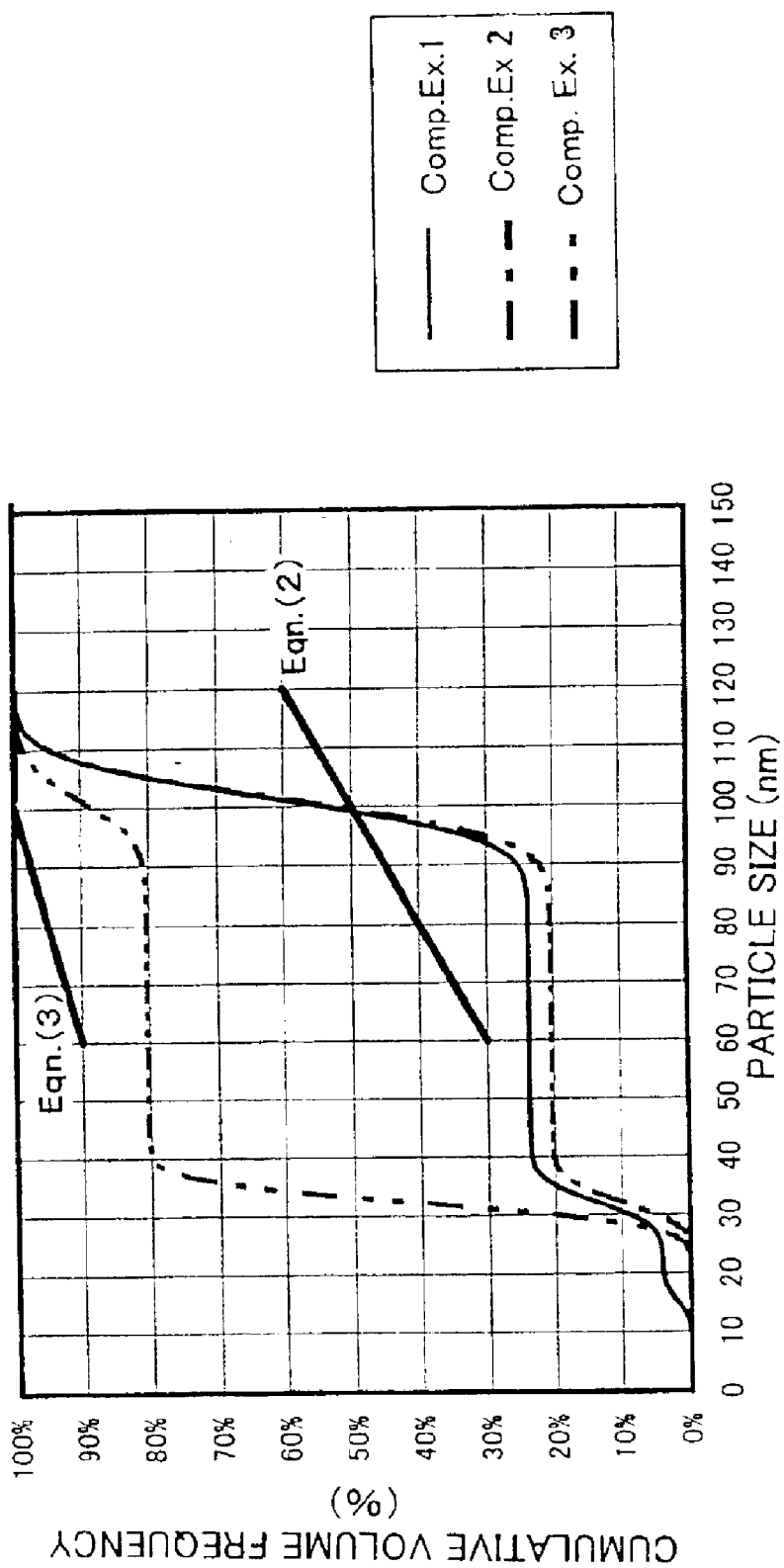
FIG. 2 is a graph for particle size-cumulative volume frequency of silica particles used in each Comparative Example.

With regard to the particle size distribution of each of the silica particles of the above-mentioned polishing composition, the particle size of the silica particles was determined in accordance with the following method for [Determination of Particle Size Distribution of Silica Particles]. The average particle size, the standard deviation and the cumulative volume frequency of the particle size on the number basis were obtained, and a graph of particle size-cumulative volume frequency was plotted. The graph of the particle size-cumulative volume frequency of the silica particles used in each of Examples is shown in FIG. 1, and the graph of the particle size-cumulative volume frequency of the silica particles used in each of Comparative Examples is shown in FIG. 2.

[Determination of Particle Size Distribution of Silica Particles]

Using silica particles in the form of slurry as a sample, the sample was observed with a transmission electron microscope "JEM-2000FX" commercially available from JEOL,

TABLE 1

| | Composition of Polishing Composition (% by weight) | | | | | | | | | | |
|---|---|---|---|---|---|---|---|---|---|---|---|
| | Total Silica | Silica A | Silica B | Silica C | Silica D | Silica E | Silica F | Silica G | Silica H | $H_2O_2$ | HEDP | pH |
| Ex. No. | | | | | | | | | | | | |
| Ex. 1 | 7.00 | — | — | — | — | — | 7.00 | — | — | 0.6 | 2.0 | 1.5 |
| Ex. 2 | 7.00 | 1.75 | — | — | 4.20 | 1.05 | — | — | — | 0.6 | 2.0 | 1.5 |
| Ex. 3 | 7.00 | 1.40 | 1.40 | 1.40 | 1.40 | 1.40 | — | — | — | 0.6 | 2.0 | 1.5 |
| Ex. 4 | 7.00 | — | — | — | — | — | 3.50 | 3.50 | — | 0.6 | 2.0 | 1.5 |
| Ex. 5 | 7.00 | — | — | — | — | — | 2.31 | 4.69 | — | 0.6 | 2.0 | 1.5 |
| Ex. 6 | 7.00 | — | — | — | — | — | 3.50 | — | 3.50 | 0.6 | 2.0 | 1.5 |
| Comp. Ex. No. | | | | | | | | | | | | |
| Comp. Ex. 1 | 7.00 | 0.27 | — | 1.35 | — | 5.38 | — | — | — | 0.6 | 2.0 | 1.5 |
| Comp. Ex. 2 | 7.00 | — | — | 1.40 | — | 5.60 | — | — | — | 0.6 | 2.0 | 1.5 |
| Comp. Ex. 3 | 7.00 | — | — | 5.60 | — | 1.40 | — | — | — | 0.6 | 2.0 | 1.5 |

In the table:

Silica A is "Cataloid SI-30" (commercially available from CATALYSTS & CHEMICALS INDUSTRIES CO., LTD.);

Silica B is "Cataloid SI-40" (commercially available from CATALYSTS & CHEMICALS INDUSTRIES CO., LTD.);

Silica C is "Cataloid SI-50" (commercially available from CATALYSTS & CHEMICALS INDUSTRIES CO., LTD.);

Silica D is "Cataloid SI-45P" (commercially available from CATALYSTS & CHEMICALS INDUSTRIES CO., LTD.);

LTD. (80 kV, magnification: 10000 to 50000 times), and its TEM image was photographed. Each of the photographs was incorporated into a personal computer as image data with a scanner connected thereto. The projected area diameter of individual silica particles was determined using the analysis software "WinROOF" (commercially available from MITANI CORPORATION), and considered as the diameter of silica particles. After analyzing data for 1000 or more silica particles, the average particle size and the standard deviation on the number basis of the silica particles were calculated from the diameters of the silica particles based on the analyzed data using the spreadsheet software "EXCEL" (commercially available from Microsoft Corporation). The results are shown in Table 2.

TABLE 2

| Ex. No. | Average Particle Size (γ) Found Value (nm) | Standard Deviation (δ) Found Value (nm) | 0.3 × Average Particle Size (nm) |
|---|---|---|---|
| Ex. 1 | 22.6 | 15.8 | 6.8 |
| Ex. 2 | 16.4 | 9.1 | 4.9 |
| Ex. 3 | 17.9 | 8.1 | 5.4 |
| Ex. 4 | 21.6 | 8.5 | 6.5 |
| Ex. 5 | 21.4 | 7.1 | 6.4 |
| Ex. 6 | 14.3 | 5.5 | 4.3 |
| Comp. Ex. No. | | | |
| Comp. Ex. 1 | 23.1 | 17.7 | 6.9 |
| Comp. Ex. 2 | 39.4 | 22.1 | 11.8 |
| Comp. Ex. 3 | 32.3 | 6.9 | 9.7 |

On the basis of the particle size distribution data of the silica particles obtained by changing from the diameters of the silica particles using the spreadsheet software "EXCEL" to particle volumes, a proportion (% on volume basis) of the particles having a given particle size is expressed as a cumulative frequency of the silica particles counted from a small particle size side in the entire particles, to give a cumulative volume frequency (%).

On the basis of the particle sizes of the silica particles and the data for the cumulative volume frequency obtained as described above, the cumulative volume frequency was plotted against the particle size, to give a graph of particle size-cumulative volume frequency.

In addition, an object to be polished was polished with each of the polishing compositions of Examples 1 to 6 and Comparative Examples 1 to 3 under the following polishing conditions. Next, the microwaviness and the micropits of the surface of the object to be polished were determined and evaluated in accordance with the following method. The evaluation of the microwaviness was made on 10 objects to be polished for each of Examples and Comparative Examples, and the results are an average of individual data obtained with each of objects to be polished. The results are shown in Table 3.

(Polishing Conditions)
Polishing testing machine: "Double-Sided Processing Machine, Model 9B," commercially available from SPEEDFAM CO., LTD.
Polishing pad: "Bellatrix N0058" manufactured by Kanebo, LTD.
Processing pressure: 7.8 kPa
Feeding amount for a slurry: 100 mL/min
Rotational speed of a lower platen: 30 r/min
Polishing time period: 4 minutes
Number of substrates introduced: 10

[Determination of Microwaviness]
Each of the substrates to be determined were determined for short-wavelength waviness and long-wavelength waviness at two points of 180° intervals (total of 4 points) using Zygo New-View 200 commercially available from Zygo under the conditions given below.

| Object Lens: | Magnification, 2.5 times, Michelson |
|---|---|
| Zooming Ratio: | 0.5 |
| Filter: | Band Pass |
| Filter type: | FFT Fixed |
| Wavelength Determined: | |
| Short-Wavelength Waviness: | Filter High Wavelength 0.05 mm |
| | Filter Low Wavelength 0.50 mm |
| Long-Wavelength Waviness: | Filter High Wavelength 0.50 mm |
| | Filter Low Wavelength 5.00 mm |

Figure 3:
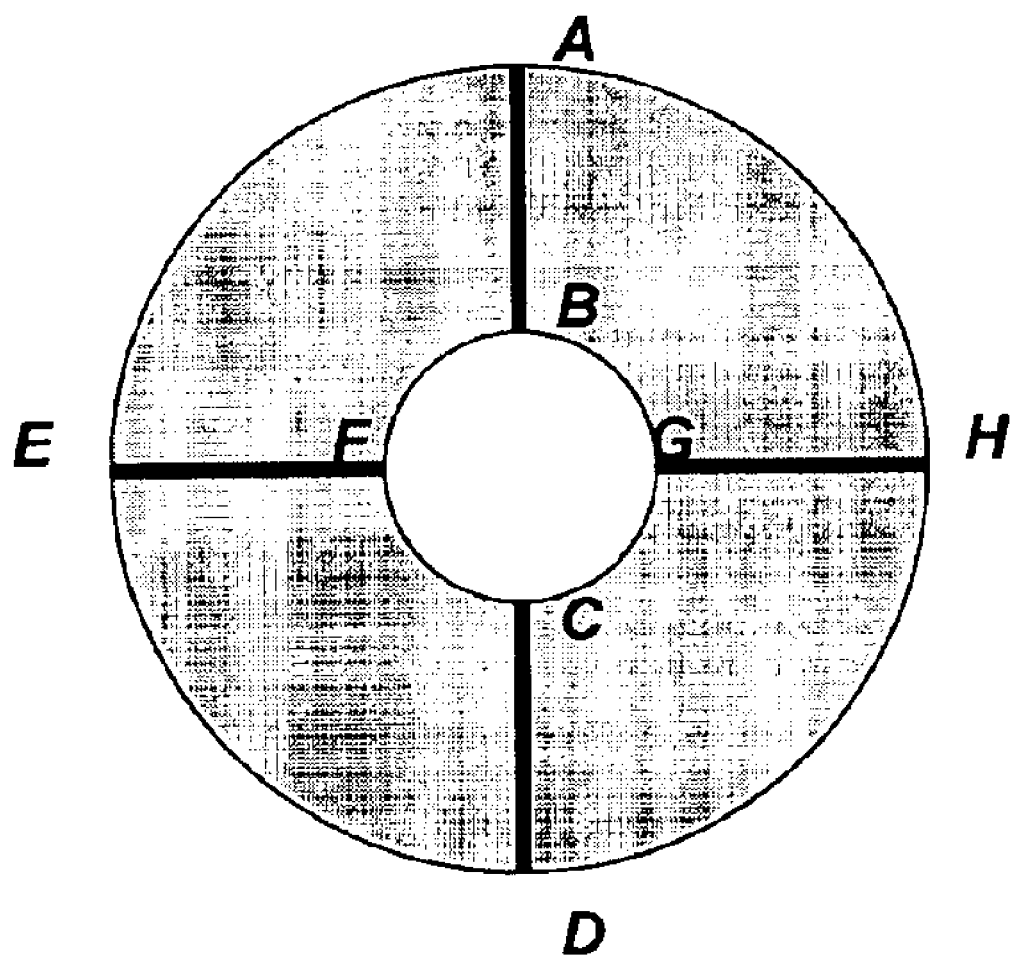
FIG. 3 is a schematic view showing the sites on the substrate scanned by a differential interference microscope in the determination of micropits.

[Determination of Micropits]
Front and back sides of 5 substrates were observed with a differential interference microscopic system [metal microscope "BX60M" (commercially available from OLYMPUS OPTICAL Co., Ltd.), magnification: 50 times (eyepiece: 10 times, objective lens: 5 times)], and the number of micropits were counted, with scanning along line segments AB, CD, EF, GH as shown in FIG. 3.

The results obtained in accordance with the following evaluation criteria are shown in Table 3.

Evaluation Criteria
"⊚": less than 0.3 micropits/side;
"○": 0.3 micropits/side or more and less than 1 micropit/side;
"Δ": 1 micropit/side or more and less than 5 micropits/side;
"x": 5 micropits/side or more and less than 20 micropits/side;

TABLE 3

| | Microwaviness | | |
|---|---|---|---|
| Ex. No. | Short-Wavelength (nm) | Long-Wavelength (nm) | Micropits |
| Ex. 1 | 0.106 | 0.227 | ⊚ |
| Ex. 2 | 0.110 | 0.248 | ○ |
| Ex. 3 | 0.111 | 0.217 | ⊚ |
| Ex. 4 | 0.108 | 0.230 | ⊚ |
| Ex. 5 | 0.108 | 0.235 | ⊚ |
| Ex. 6 | 0.110 | 0.229 | ⊚ |
| Comp. Ex. No. | | | |
| Comp. Ex. 1 | 0.142 | 0.336 | x |
| Comp. Ex. 2 | 0.149 | 0.343 | x |
| Comp. Ex. 3 | 0.152 | 0.311 | x |

It can be seen from the results of Table 3 that the polishing compositions of Examples 1 to 6 can sufficiently reduce microwaviness and also micropits of the surface of the object to be polished, as compared to those of Comparative Examples 1 to 3.

According to the polishing composition of the present invention, a substrate for a disk having sufficient smoothness for practical purposes and having reduced microwaviness of the surface and reduced surface defects such as micropits can be efficiently obtained.

What is claimed is:
1. A polishing composition for a substrate for memory hard disk, comprising silica particles in an aqueous medium, wherein the silica particles satisfy a relationship between an average particle size (r) of the silica particles on the number basis and a standard deviation (σ) on the number basis of the following formula (1):

$$\sigma \geq 0.3 \times r \quad (1)$$

wherein r is an average particle size (nm) of the silica particles on the number basis, and σ is a standard deviation (nm) on the number basis, wherein the average particle size is obtained by a determination by transmission electron microscope (TEM) observation, and wherein a relationship between a particle size (R) and a cumulative volume frequency (V) in a range of particle sizes of from 60 to 120 nm satisfies the following formulas (2) and (3):

$$V \geq 0.5 \times R \quad (2)$$

$$V \leq 0.25 \times R + 75 \quad (3)$$

wherein R is a particle size (nm) of the silica particles, and V is a cumulative volume frequency (%) counted from a small particle size side of the silica particles.

2. The polishing composition according to claim 1, wherein the silica particles are colloidal silica particles.

3. The polishing composition according to claim 1, further comprising at least one member selected from the group consisting of acids, salts thereof and oxidizing agents.

4. The polishing composition according to claim 2, further comprising at least one member selected from the group consisting of acids, salts thereof and oxidizing agents.

5. The polishing composition according to claim 1, wherein a pH thereof is from 1 to 4.5.

6. The polishing composition according to claim 2, wherein a pH thereof is from 1 to 4.5.

7. The polishing composition according to claim 3, wherein a pH thereof is from 1 to 4.5.

8. The polishing composition according to claim 4, wherein a pH thereof is from 1 to 4.5.

9. A method of reducing microwaviness of a substrate for memory hard disk, comprising the step of polishing the substrate for memory hard disk with the polishing composition of claim 1.

10. A method of reducing microwaviness of a substrate for memory hard disk, comprising the step of polishing the substrate for memory hard disk with the polishing composition of claim 2.

11. A method of reducing microwaviness of a substrate for memory hard disk, comprising the step of polishing the substrate for memory hard disk with the polishing composition of claim 3.

12. A method of reducing microwaviness of a substrate for memory hard disk, comprising the step of polishing the substrate for memory hard disk with the polishing composition of claim 4.

13. A method of reducing microwaviness of a substrate for memory hard disk, comprising the step of polishing the substrate for memory hard disk with the polishing composition of claim 5.

14. A method of reducing microwaviness of a substrate for memory hard disk, comprising the step of polishing the substrate for memory hard disk with the polishing composition of claim 6.

15. A method for manufacturing a substrate for memory hard disk, comprising the step of polishing a Ni—P plated substrate for memory hard disk with the polishing composition of claim 1.

16. A method for manufacturing a substrate for memory hard disk, comprising the step of polishing a Ni—P plated substrate for memory hard disk with the polishing composition of claim 2.

17. A method for manufacturing a substrate for memory hard disk, comprising the step of polishing a Ni—P plated substrate for memory hard disk with the polishing composition of claim 3.

18. A method for manufacturing a substrate for memory hard disk, comprising the step of polishing a Ni—P plated substrate for memory hard disk with the polishing composition of claim 4.

19. A method for manufacturing a substrate for memory hard disk, comprising the step of polishing a Ni—P plated substrate for memory hard disk with the polishing composition of claim 5.

20. A method for manufacturing a substrate for memory hard disk, comprising the step of polishing a Ni—P plated substrate for memory hard disk with the polishing composition of claim 6.

* * * * *